(12) United States Patent
Pérez Álvarez et al.

(10) Patent No.: US 10,949,758 B2
(45) Date of Patent: Mar. 16, 2021

(54) DATA MANAGEMENT EXTERNALIZATION FOR WORKFLOW DEFINITION AND EXECUTION

(71) Applicant: Xerox Corporation, Norwalk, CT (US)

(72) Inventors: José Miguel Pérez Álvarez, Seville (ES); Mario Cortes Cornax, Grenoble (FR); Adrian Corneliu Mos, Meylan (FR); Yves Hoppenot, Notre-Dame-de-Mésage (FR)

(73) Assignee: Xerox Corporation, Norwalk, CT (US)

( * ) Notice: Subject to any disclaimer, the term of this patent is extended or adjusted under 35 U.S.C. 154(b) by 935 days.

(21) Appl. No.: 15/609,274

(22) Filed: May 31, 2017

(65) Prior Publication Data

US 2018/0349778 A1     Dec. 6, 2018

(51) Int. Cl.

| | |
|---|---|
| *G06F 16/30* | (2019.01) |
| *G06N 5/04* | (2006.01) |
| *G06Q 10/06* | (2012.01) |
| *G06F 16/245* | (2019.01) |
| *G06F 16/23* | (2019.01) |
| *G06F 16/21* | (2019.01) |
| *G06N 5/02* | (2006.01) |

(52) U.S. Cl.
CPC ............. *G06N 5/04* (2013.01); *G06F 16/212* (2019.01); *G06F 16/2379* (2019.01); *G06F 16/245* (2019.01); *G06Q 10/067* (2013.01); *G06N 5/022* (2013.01)

(58) Field of Classification Search
CPC ..... G06N 5/04; G06F 16/2379; G06F 16/212; G06F 16/2455; G06Q 10/067

USPC ........ 707/609, 687, 705, 769, 790, 813, 821
See application file for complete search history.

(56) References Cited

U.S. PATENT DOCUMENTS

| | | | |
|---|---|---|---|
| 9,021,420 B2 | 4/2015 | Jacquin et al. | |
| 2008/0120129 A1* | 5/2008 | Seubert | G06Q 10/10 705/35 |
| 2013/0232464 A1 | 9/2013 | Jaquin et al. | |
| 2013/0304724 A1* | 11/2013 | Rosjat | G06F 16/2455 707/722 |
| 2015/0046212 A1 | 2/2015 | Mos | |

(Continued)

OTHER PUBLICATIONS

Becker, et al., "PICTURE—a new approach for domain-specific process modelling," CAiSE Forum, pp. 11-15 (2007).

(Continued)

*Primary Examiner* — Sana A Al-Hashemi
(74) *Attorney, Agent, or Firm* — Fay Sharpe LLP

(57) ABSTRACT

A computer-implemented method and system provide for externalizing data in process execution environments. The method includes extracting a data model from a domain specification. The data model includes a set of business objects, at least some of the business objects being linked to a domain-specific activity type by a business object relation. A database is generated from the data model which is accessible through an application program interface. Provision is made for a user to generate a domain-specific process model with links to business objects in the domain specification. The domain-specific process model is transformed to a domain-independent process model which has access to the database through the application program interface at runtime.

20 Claims, 9 Drawing Sheets

(56) References Cited

U.S. PATENT DOCUMENTS

| | | | |
|---|---|---|---|
| 2015/0160988 A1* | 6/2015 | Scomparim | G06F 9/4488 719/318 |
| 2016/0162816 A1 | 6/2016 | Suri et al. | |
| 2016/0306790 A1 | 10/2016 | Mos et al. | |
| 2016/0314351 A1 | 10/2016 | Mos et al. | |

OTHER PUBLICATIONS

Ed-Douibi, et al., "EMF-REST: generation of RESTful APIs from models," Proc. 31st Annual ACM Symp. on Applied Computing, pp. 1446-1453. ACM (2016).

Fielding, "Architectural styles and the design of network-based software architectures," Ph.D. thesis, University of California, Irvine, pp. 1-180 (2000).

Grundy, et al., "Generating domain-specific visual language editors from high-level tool specifications," 21st IEEE/ACM Int'l Conf. on Automated Software Engineering (ASE'06) IEEE, pp. 25-36 (2006).

Heitkötter, "A framework for creating domain-specific process modeling languages," 4th Int'l Conf. on Software and Data Technologies (ICSOFT), pp. 127-136 (2012).

Mernik, et al., "When and how to develop domain-specific languages," ACM computing surveys (CSUR), vol. 37, No. 4, pp. 316-344 (2005).

U.S. Appl. No. 15/228,493, filed Aug. 4, 2016, Mos.

U.S. Appl. No. 15/407,546, filed Jan. 17, 2017, Cortes Cornax, et al.

Mos, et al., "Improving process robustness through domain-specific model transformations," 17th IEEE Int'l Enterprise Distributed Object Computing Conference Workshops (EDOCW), IEEE, pp. 188-193 (2013).

Mos et al., "A platform-independent mechanism for de-ployment of business processes using abstract services," Enterprise Distributed Object Computing Conference Workshops (EDOCW), 2013, 17th IEEE International. IEEE, pp. 71-78 (2013).

Mos, et al., "Generating domain-specific process studios," 20th Int'l Enterprise Distributed Object Computing Conference (EDOC), pp. 1-10. IEEE (2016).

Mos, "Domain specific monitoring of business processes using concept probes," Service-Oriented Computing—ICSOC Workshops, Springer, pp. 213-224 (2015).

Pinggera, et al., "How the structuring of domain knowledge helps casual process modelers," Conceptual Modeling—ER 2010, Springer, pp. 445-451 (2010).

Rosemann, et al., "The six core elements of business process management," Handbook on Business Process Management, 1, pp. 105-122, Springer (2015).

* cited by examiner

DATA MANAGEMENT EXTERNALIZATION FOR WORKFLOW DEFINITION AND EXECUTION

BACKGROUND

The exemplary embodiment relates to business process design and finds particular application in connection with a system and method for generating complex integrated development environments for domain-specific business processes that enable externalization and sharing of domain-specific business objects.

Business Process Management (BPM) provides a methodology and tools that enable the management of business processes (BPs) as they evolve throughout their lifecycles. BPM includes business process design, which enables the expression of the inner workings of BPs to render them executable. A Business Process Management Suite (BPMS) executes the business processes and connects them to various enterprise resources, such as a personnel directory, various legacy applications, and, in some cases, to the organization's Service Oriented Architecture(s) (SOA). An enterprise SOA typically manages the reusable technical services used to execute tasks that occur in business processes.

BPs are often modeled in abstract terms by business-oriented users who have a good business knowledge and understanding of the various roles in the organization, but who are not necessarily familiar with the details of the Information Technology (IT) services that will ultimately be used to implement the processes in the SOA. Using BPM, business analysts can design, manage and control business processes themselves, up to the execution and analysis of the results.

Currently, BPM solutions are domain-independent and platform-dependent. See, Mos, A., "Domain specific monitoring of business processes using concept probes," Service-Oriented Computing (ICSOC) Workshops, pp. 213-224. Springer (2015) and U.S. application Ser. No. 15/228,493, filed Aug. 4, 2016, entitled GENERATING DOMAIN-SPECIFIC PROCESS STUDIOS, by Adrian C. Mos, et al., collectively referred to herein as "Mos 2016." Different users within an organization use different tools, based on their expertise. Business experts generate a description of the specific business domain, such as logistics, healthcare, document outsourcing, etc. Business analysts, in turn, model the business domain with dedicated tools (i.e., model specific type of task with implicit domain knowledge). Business-oriented users then use a language such as the Business Process Model and Notation (BPMN) language to describe the business process. However, BPMN is considered to be too generic and technical for use by business experts, limiting the involvement of such experts, in particular for design and governance activities. BPMN provides limited support for data modeling, which is a key aspect for BPM. See, Rosemann, M., et al., "The six core elements of business process management," Handbook on Business Process Management 1, pp. 105-122, Springer (2015). This results in a plethora of platform-specific BPM tools for data management. Such BPM tools tend to force the process designer to define and manage business objects of a business process in a tightly-coupled way with the execution platform. This limits the design capabilities for data, and makes the designer completely dependent on a specific platform. If an organization decides to move to another BPM platform, or has to adapt to a specific workflow engine, the data-migration can be very costly and error prone. The new platform may propose to import the organization's data model. But this can entail a large platform-specific integration effort.

There is therefore a need for a domain-specific and platform-independent approach to externalize process data and easily connect it to the workflow.

INCORPORATION BY REFERENCE

The following references, the disclosures of which are incorporated herein in their entireties by reference, are mentioned:

U.S. Pub No. 20130232464, published Sep. 5, 2013, entitled DEPLOYMENT OF BUSINESS PROCESSES IN SERVICE-ORIENTED ARCHITECTURE ENVIRONMENTS, by Thierry Jacquin; et al.

U.S. Pub No. 20150046212, published Feb. 12, 2015, entitled MONITORING OF BUSINESS PROCESSES AND SERVICES USING CONCEPT PROBES AND BUSINESS PROCESS PROBES, by Adrian C. Mos.

U.S. Pub No. 20160162816, published Jun. 9, 2016, entitled HUMAN TASK MONITORING AND CONTEXTUAL ANALYSIS FOR DOMAIN-SPECIFIC BUSINESS PROCESSES, by Kunal Suri, et al.

U.S. Pub No. 20160306790, published Oct. 20, 2016, entitled PRESERVING CONSISTENCY IN DOMAIN-SPECIFIC BUSINESS PROCESSES THROUGH SEMANTIC REPRESENTATION OF ARTIFACTS, by Adrian C. Mos, et al.

U.S. Pub No. 20160314351, published Oct. 27, 2016, entitled EXTENDING GENERIC BUSINESS PROCESS MANAGEMENT WITH COMPUTER VISION CAPABILITIES by Adrian C. Mos, et al.

U.S. application Ser. No. 15/228,493, filed Aug. 4, 2016, entitled GENERATING DOMAIN-SPECIFIC PROCESS STUDIOS, by Adrian C. Mos, et al., hereinafter, "Mos 2016".

U.S. application Ser. No. 15/407,546, filed Jan. 17, 2017, entitled DOMAIN-SPECIFIC BUSINESS OBJECTS FOR PROCESS DESIGN, by Mario Cortes-Cornax, et al., hereinafter, "Cortes-Cornax 2017".

BRIEF DESCRIPTION

In accordance with one aspect of the exemplary embodiment, a method for externalizing data includes extracting a data model from a domain specification. The data model includes a set of business objects, at least some of the business objects being linked to a domain-specific activity type by a business object relation. A database is generated from the data model which is accessible through an application program interface. Provision is made for a user to generate a domain-specific process model with links to business objects in the domain specification. The domain-specific process model is transformed to a domain-independent process model which has access to the database through the application program interface. At least one of the extracting, generating, providing and transforming may be performed with a processor.

In accordance with another aspect of the exemplary embodiment, a system for externalizing data is provided. The system includes a database and application program interface generator which generates a database from a data model of a domain specification, the data model including a set of business objects, at least some of the business objects being linked to a domain-specific activity type by a business object relation and also generates an application program interface for accessing the data model. A process specification component provides for a user to generate a domain-specific process model with links to business objects in the domain specification. A generator is provided for transforming the domain-specific process model to a domain-independent process model which has access to the database through the application program interface. At least one processor implements the database and application program interface generator, process specification component, and generator for transforming the domain-specific process model to the domain-independent process model.

In accordance with another aspect of the exemplary embodiment, a method for externalizing data includes instantiating a domain specification as an instance of a domain meta-model, the domain specification including a set of business objects, and instantiating a domain-specific process model as an instance of a process meta-model. A data model is extracted from the domain specification, the data model including the set of business objects. A database is generated from the data model which is accessible through an application program interface. A domain-independent process model is generated from the domain-specific process model and the domain specification, the domain-independent process model being an instance of a domain-independent process meta-model, the domain-independent process model having access to the database through the application program interface. A process is executed with the domain-independent process model. The process execution includes generating one or more calls to the application program interface to perform functions with respect to business objects in the database.

One or more of the steps of the method may be performed with a processor.

DETAILED DESCRIPTION

Figure 1:
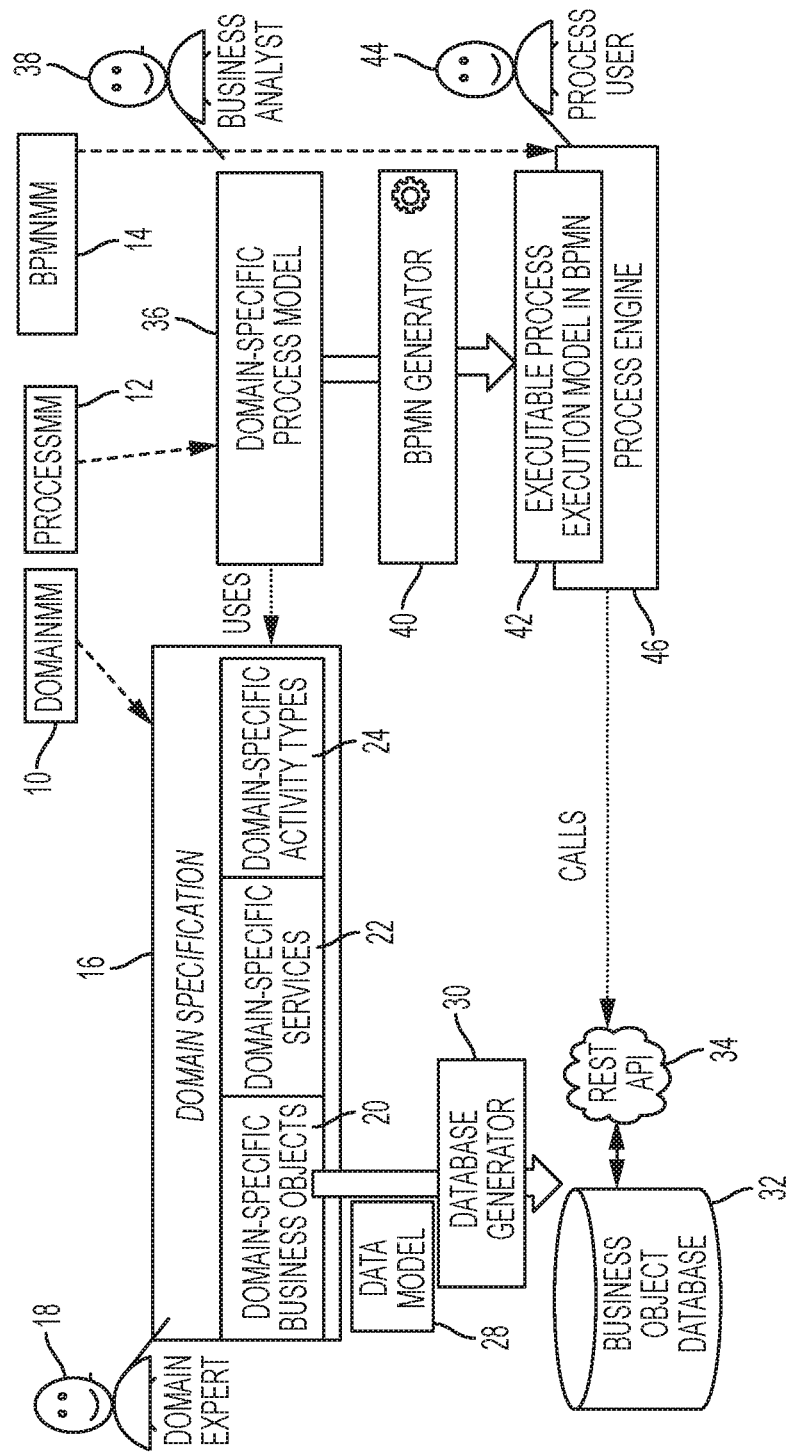
FIG. 1 is an overview of domain-specific process studio generation with particular reference to incorporation of domain-specific business objects, in accordance with one aspect of the exemplary embodiment.

Aspects of the exemplary embodiment relate to a domain-specific approach for managing the data flow of a business process independently from execution of the process. This separation enables an organization to manage the process data in a generic manner, but at the same time, be able to easily connect it to different automated work flows.

In the framework described herein, a Domain Specific Language (DSL) is used as an effective means to cope with application domains, providing improvements in expressiveness and ease of use. Mernik, M., et al., "When and how to develop domain-specific languages," ACM computing surveys (CSUR), vol. 37, no. 4, pp. 316-344 (2005). A generative approach is used to generate a business object database automatically, from a domain-specific model, and to expose it as an application program interface (API), such as a Representational State Transfer (REST) interface. The REST API can be accessed from a process execution engine in order to fetch, update, and save the data. In addition, the data can be managed independently of the execution platform. The solution automatically generates the necessary artefacts that are employed to manage the data (e.g., selected from create, update, read and delete) from the executable process activities. The externalization of the data (specifically, a set of domain-specific business objects) allows users to define a data-model in a simple way and connect it to domain-specific activities. Then, they are able to consistently and repetitively reuse the externally-stored data across business processes with all the advantages enjoyed by the domain-specific activity types such as sweeping changes of document properties across processes, consistent connections between behavior and data for domain activities, and extensible generation patterns when targeting specific deployment platforms. This is advantageous when different users employ different BPM platforms.

Various terms used herein are defined as follows:

Each "domain-specific business object" (or simply, a "business object") corresponds to one of the data entities that are to be defined in a domain and will be used in enterprise processes. Each business object (or data object) refers to a piece of data, such as a text document, PDF document, or the like, and which can be referred to in a representation of a business process. The document may have been already created or may be created or updated in the process.

Each business object complies with a business object definition. All the business objects are considered to be governed objects. This means that they generally include an identifier, a label, a version, and a description.

A "business object database" is a data structure that stores business objects, which are accessible to process engines through an API.

A "domain meta-model" (DomainMM) describes the formal structure of a business domain in a domain-specific language (DSL), and incorporates business object definitions for creating domain-specific business objects (e.g., documents) that are used in that domain as well as formalizing the relations which can exist between activity types (e.g., CREATE and UPDATE), and the business objects.

A "process meta-model" (ProcessMM) describes the formal structure of a business process and may be domain-specific or domain independent.

A "domain-specific language" (DSL) is a language which is specific to the domain, and can be specific to the type of modeling being performed.

A "domain-independent language" is a language which is independent of the domain, such as Business Process Modeling and Notation (BPMN) or other business process execution language (BPEL), such as Business Process Execution Language for Web Services (BPEL4WS).

A "domain specification" is an instance of a DomainMM.

A "domain-specific process model" is a model of a business process which is generated using a Domain-Specific Process Modeling Language (DSPML) in compliance with the process meta-model and DomainMM. As an example, the domain-specific process model can be generated using a standard definition of concepts, such as BPDM.

An "attribute" represents atomic information contained in a business object.

A "data relation" (DataRelation) represents a dependency relation between two business objects. A source and target multiplicity (cardinality) can be defined as well as a containment flag referring to the source.

A "business object relation" (BORelation) represents a dependency relation between a domain-specific activity type and a business object. Four different BORelations are defined by way of example: CREATE, UPDATE, READ and DELETE.

The general structure of the domain corresponds to an entity-relation structure. In the following, generative mechanisms that connect the generated process activities with a generated business object database, exposed as a REST-APIs, will be described.

With reference to FIG. 1, which illustrates an overview of the system and method, the system employs a DomainMM 10, a ProcessMM 12, and a domain-independent, BPMN meta-model (BPMNMM) 14. A domain specification 16 corresponds to an instance of the DomainMM 10. The domain specification 16 may be generated by a user 18, such as a domain expert or corporate technical expert. The domain specification 16 defines the organization domain independently of any process definition. The domain specification 16 includes domain-specific business objects 20, domain-specific services (DSServices) 22, and domain-specific activity types (DSActivityTypes) 24 and links between them.

Each of the DSActivityTypes 24 is a behavioral instruction in a domain that can be encapsulated independently. For example, one such instruction may be "Perform an Optical Character Recognition (OCR)". Each DSService 22 corresponds to a technical artefact that implies automatic processing. For example, the example DSActivityType 24 for OCR processing could be related to a DSService 22 that actually performs the OCR. The business objects 20 are combined to define a data model 28 that may be reused in a collection of related processes, generally referring to the same domain. For example, a business object 20 such as a document could be the entry data of an OCR process.

A database generator 30 generates a business object database 32. The database 32 stores a collection of reusable business objects 20. The database 32 may be in the form of a relational database. The database 32 is accessed through an application program interface (API) 34, such as the illustrated REST-API. This provides a platform-independent data externalization. The API 34 may be generated by the database generator 30 or by a separate component.

A domain-specific process model (DSPM) 36 is built in a domain-specific language, e.g., by a business analyst 38, as an instance of the ProcessMM 12. The DSPM 36 defines the process and includes links to the domain specification 16 to describe the business objects 20, services 22, and activity types 24 that are involved in the process. The building of the DSPM 36, representing a domain-specific process (DSP), includes connecting the different steps that refer to the DSActivityTypes 24 previously defined in the domain model 16. The link to the DSActivityTypes gathers the information about the related DSServices 22 and DSBusinessObjects 20. Custom activities can be defined in the domain-specific process model 36. This may imply the creation of a new DSActivityType 24 in the domain specification 16, if the custom activity is intended to be reused in other processes.

The creation of such process models is domain-specific, and therefore much easier to understand and build. At the same time, the process models 36 keep the knowledge defined in the domain specification 16.

A BPMN generator 40 converts the domain-specific process model 36 to a process execution model 42 expressed in a domain-independent language, such as BPMN. A process user 44 can interact with the process execution 42, using a suitable process engine 46.

The REST interface 34 is accessible from the process engine 46. The process engine 46 has suitable API connectors, such as REST connectors, in order to execute REST methods called from the process activities. In this way business objects 20 can be identified in the database 32 and referred to in the model 42.

Figure 2:
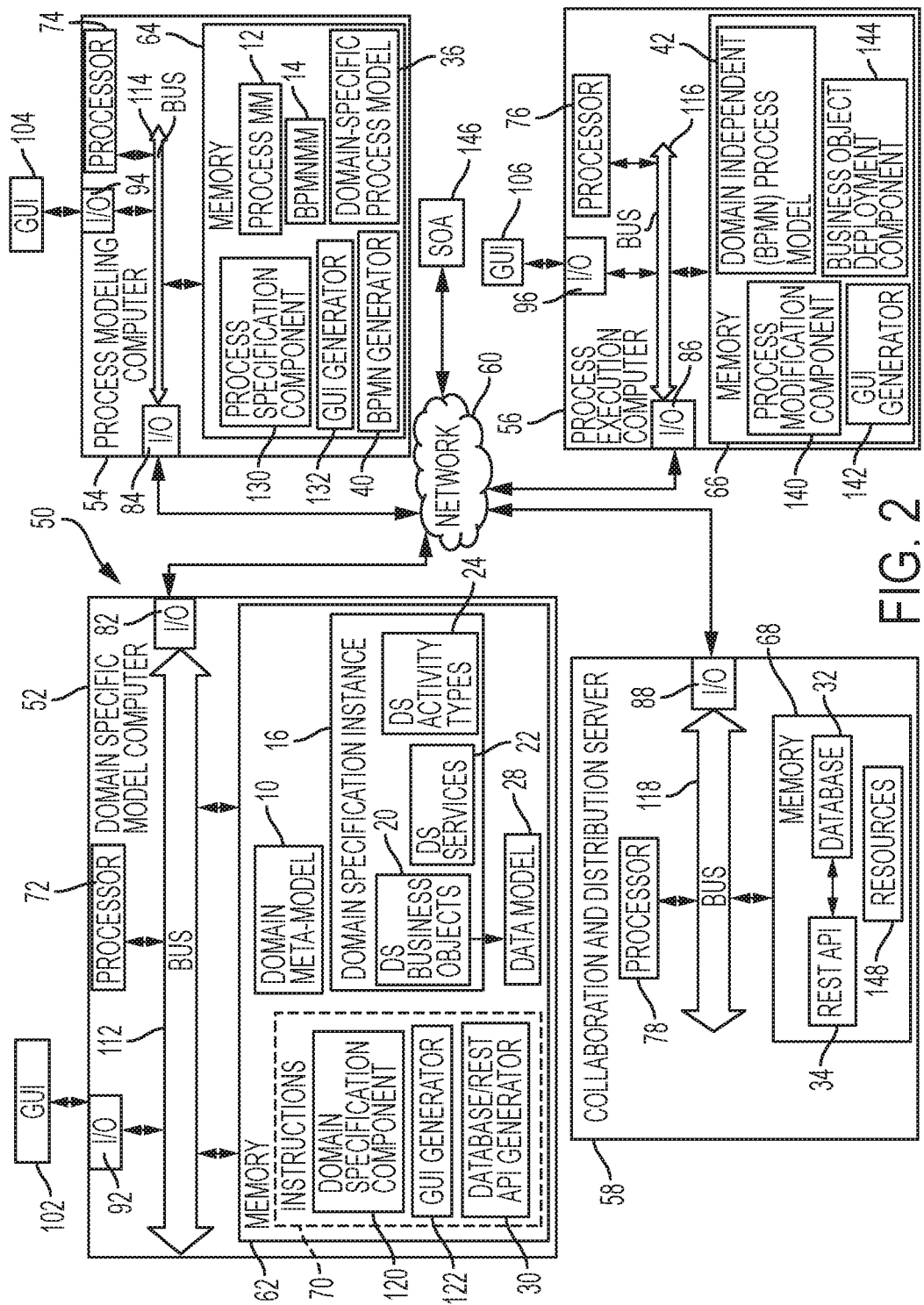
FIG. 2 is a functional block diagram of network system in which domain-specific business objects are created, externalized, and accessed.

FIG. 2 is a functional block diagram of a computer implemented system 50 for externalizing business data 28 that can be used in a business process workflow for a given business domain. The system incorporates the elements illustrated in FIG. 1. The illustrated system 50 is implemented though computing devices 52, 54, 56, 58 that are connected by a network (or networks) 60. As will be appreciated, one or more of the computing devices may be combined and the components may be hosted by different computing devices from those illustrated.

Each computing device includes memory 62, 64, 66, 68, which stores instructions 70 and a processor 72, 74, 76, 78, in communication with the memory, for executing the instructions. A network interface 82, 84, 86, 88 connects each computing device to the network 60. Computing devices 52, 54, 56 each include a local interface 92, 94, 96, connected to a graphical user interface 102, 104, 106, such as a display device with a touchscreen, cursor control device, and/or keyboard. Hardware components (processor, memory, and interfaces) of each computing device 52, 54, 56, 58 are communicatively connected by a data/control bus 112, 114, 116, 118.

The first computing device 52 is used for domain specification, which includes data modeling. The instructions 70 include a domain specification component 120, a GUI generator 122, and the database generator 30. The domain specification component 120 generates the domain specification 16 as an instance of the DomainMM 12, based on user inputs via the GUI 102. The GUI generator 122 generates a graphical representation of the domain specification 16 for display to the user on the GUI. The database generator 30 generates the database 32 and REST API 34, which are output to the fourth computer device 58, via the network 60. In one embodiment, a generative approach is used to automatically generate the database from the domain-specific data model 28 and expose it as a REST interface. See, for example, Fielding, R. T., "Architectural styles and the design of network-based software architectures," Ph.D. thesis, University of California, Irvine (2000). As will be appreciated, the system 50 may include more than one data modeling computers 52, operated by different domain experts 18.

The second computing device 54 is used for process modeling. The instructions stored in memory 64 include a process specification component 130, a GUI generator 132, and the BPMN generator 40. The process specification component 130 generates the process model 36, based on the ProcessMM 10 and Domain Specification 16, and based on user inputs via the GUI 104. The GUI generator 132 generates a graphical representation of the process model 36 for display to the user on the GUI 104. As described in Cortes-Cornax 2017, this may include using graphical description templates for representing process steps in a graphical representation of the process. The domain-independent (e.g., BPMN) generator 40 generates a process execution model 42 in a domain-independent language, such as BPMN. The BPMN process model 42 is output to the third computer device 56, via the network 60. The BPMN process model 42 complies with the BPMNMM 14. As will be appreciated, the system 50 may include more than one process modeling computers 54, operated by different business analysts 38.

The third computing device 56 is used for process modification and/or execution in the domain—independent language (e.g., BPMN). The computing device 56 hosts a process engine 46 as a set of instructions implemented by the processor 76, including a process modification component 140, a GUI generator 142, and a business object deployment component 144. The process modification component 140 allows a user to modify the process execution model 42, based on user inputs via the GUI 106, and to execute the model in a service oriented architecture. The GUI generator 142 generates a graphical representation of the process execution model 42 for display to the user on the GUI 106. The business deployment component 144 communicates with the REST API 34, via the network, for accessing the database 32 of domain-specific business objects that are involved in the business process. As will be appreciated, any number of computing devices 56 may be linked in this way to the database 32. As will be appreciated, the system 50 may include more than one process execution computers 56, operated by different process users 44.

A BPMN process 42 which is received by, modified by, or executed by the computing device 56 has a pre-configured data connection layer that can be shared by different process engines 46. A generated BPMN 42 process may be deployed in a Service Oriented Architecture (SOA) 146.

The fourth computing device 58 may be a collaboration and distribution server which facilitates sharing of enterprise resources 148 across the network 60. The resources 148 may be stored on the computing device 58 or a linked computing device(s). The REST API 34 is easily accessible from any work flow engine in order to fetch, update and save data 20 to/from the database. In addition, the data can be managed independently of any execution platform. This facilitates automatic generation of the artefacts that are used to manage the data (i.e., create, update, read or delete) from the executable process activities.

Each computer 52, 54, 56, 58 in the system 50 may include one or more computing devices, such as a desktop, a laptop, palmtop computer, portable digital assistant (PDA), server computer, cellular telephone, tablet computer, pager, combination thereof, or other computing device capable of executing instructions for performing one or more parts of the exemplary method. The respective memory 62, 64, 66, 68 may represent any type of non-transitory computer readable medium such as random access memory (RAM), read only memory (ROM), magnetic disk or tape, optical disk, flash memory, or holographic memory. In one embodiment, the memory comprises a combination of random access memory and read only memory. The network interface 82, 84, 86, 88 allows the respective computer to communicate with other devices via the computer network 60, such as a local area network (LAN) or wide area network (WAN), or the internet, and may comprise a modulator/demodulator (MODEM) a router, a cable, and and/or Ethernet port. The respective digital processor 72, 74, 76, 78 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The exemplary domain-specific and platform-independent approach allows externalization of process data 20 and enables it to be easily connected to the work flow. Domain Specific Languages (DSLs) are used as an executive means to cope with application domains providing improvements in expressiveness and ease of use. The exemplary system may be built on the system described in Mos 2016 and/or Cortes-Cornax 2017, by incorporating the mechanisms described herein for the externalization of the data management. Users of the present system are able to define a data model(s) 28 in a simple way and connect it to the domain specific activities. Such data models can then be consistently and repetitively reused across business processes with all the advantages enjoyed by the domain-specific activity types, such as sweeping changes of document properties across processes, consistent connections between behavior and data for domain activities, extensible generation patterns when targeting specific deployment platforms.

As in the system of Cortes-Cornax 2017, the governance facilities (i.e., understanding and control of the process) are reused for the business objects. The added data management functionality helps the business analyst to precisely define the processes being modeled. From the defined data model 28, the system aromatically generates the corresponding database 32 and exposes it with a REST-API 34. This API is then used by generated artefacts that ensure the correct execution of the process, independently of engine mechanisms.

In the exemplary embodiment, the process model 36 is processed by a BPMN generator 40 that produces a process execution model 42 in an enriched domain-independent language, such as an enriched form of BPMN. The enrichment of the domain-independent language includes adding information about specific service calls to the database API 34, previously generated from the business objects in the domain specification.

The DomainMM 10 provides a structural view of the domain and may include other objects as described in Mos 2016 and Cortes-Cornax 2017. In the example DomainMM 10 shown in FIG. 3, relevant elements of the particular business domain are defined. The DomainMM represents the business domain information for an enterprise, with regard to the specification of concepts (DSActivities), business objects, and other elements that are going to be reused in the business processes. The domain specification 16, which is an instance of the Domain MM 10 can be linked by links 150, 152 to steps in a domain-specific process model 36 generated from a ProcessMM 12. The DomainMM 10 includes definitions for domain-specific business objects 20, domain specific services 22, and domain-specific activity types 24. These are all considered to be are considered to be governed objects 156. This means that they are each associated with a set of two or more predefined features, such as at least three features. Example features may include one or more of an identifier (id), a label, a version and a description although fewer or more features may be required in some cases. Governed objects 156 are related to zero, one, or more Service Level Agreements (SLA) 154, which determine characteristics, such as the maximum execution time or the number of executions.

For ease of discussion, the same reference numerals may be used for the definitions of the various governed objects 156 in the DomainMM 10 and their corresponding instantiations in the domain specification 16. Thus a business object 20 in the DomainMM 10 implies a generic definition of a business object with which all specific business objects must comply, while a business object 20 in the domain specification 16 implies an instance of the definition, with a unique set of features to distinguish it from other instances.

The subsequently instantiated specific business objects 20 are associated with values for the features, such as a unique id (UID), a specific label (e.g., contract), etc. The id enables a specific business object in the process 42 to be associated with a unique identifier, which distinguishes the particular domain-specific business object from other business objects and other elements of the process. The label is used to identify the business object in a graphical representation, such as Contract. The version represents the version of the business object, which allows it to be linked to other versions(s) for example, if a document is to be modified. The description may list parts of the document. Each of these pieces of information may be in the form of a string of characters (EString). The features may also include an icon, which defines how the element is represented in the graphical representation. In this way, different elements may be represented by different colors, shapes, fonts, or other visually distinguishing characteristics.

Figure 3:
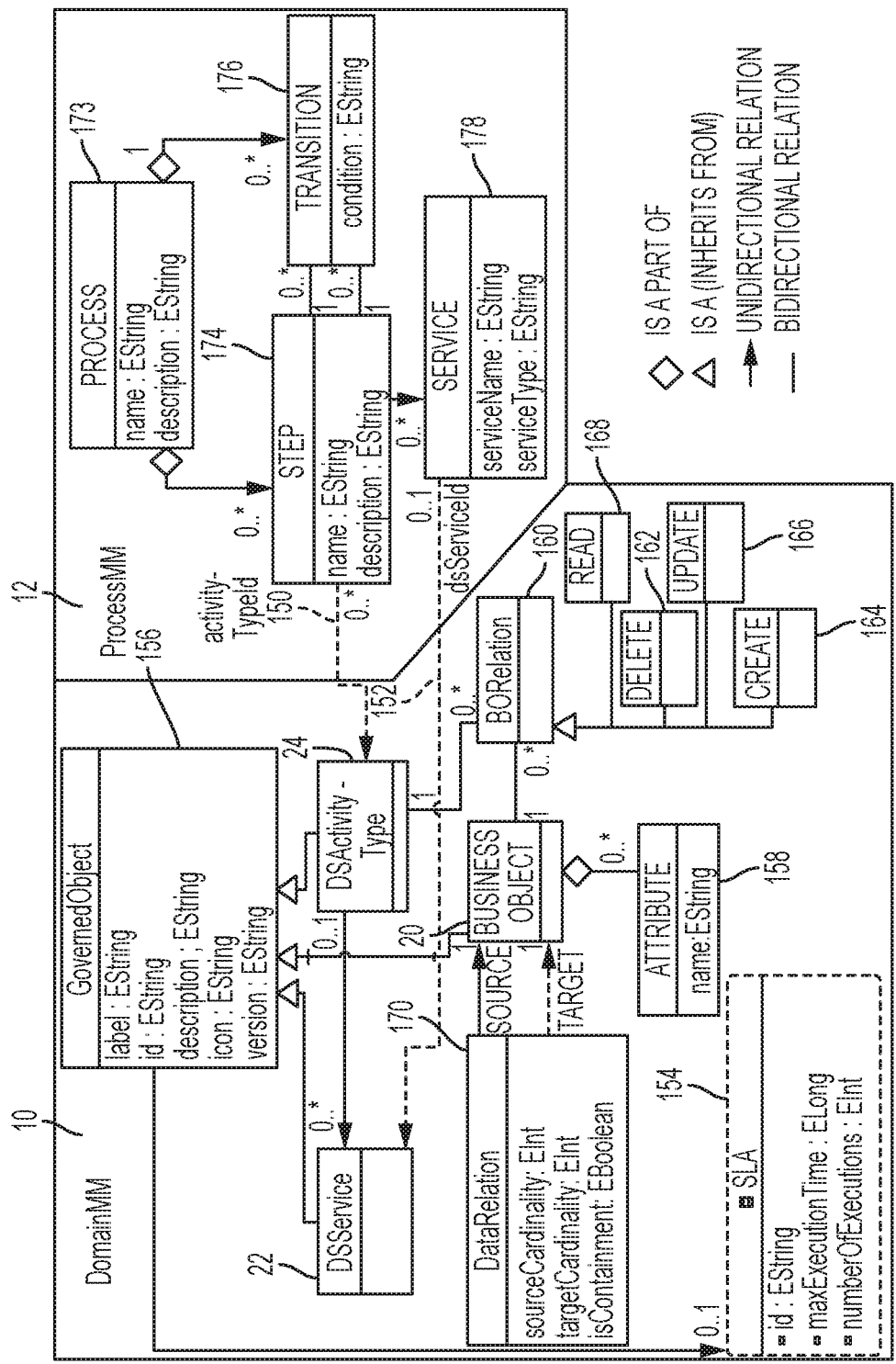
FIG. 3 illustrates a domain meta-model, extended to support data externalization, which is linked to a process meta-model.

As shown in FIG. 3, business objects can include Attributes 158. Attributes represent atomic information (e.g., an employee full name or enterprise contact information). Attributes may be shared by different documents or not be attached to any document.

As shown in FIG. 3, the activity types 24 are linked to business objects 20 by business object relations (BORelations) 160. Each BORelation represents a dependency connection between a domain-specific activity 24 and a business object 20. Four types of relation, DELETE 162, CREATE 164, READ 166 and UPDATE 168 are illustrated. Each relation has an id and a label. The DomainMM 10 can be extended to include more and/or different relations 160. The illustrated relations 160 can be converted to database calls utilized in the BPMN process model 42, namely, DELETE, POST, GET (or FETCH) and PUT, in various combinations.

A business object 20 can be linked to another business object 20 by a data relation (DataRelation) 170. Each data relation 170 includes a set of features including a source cardinality, a target cardinality, and a containment property. The source cardinality is the number of source business objects in the relation (e.g., selected from 1, 2, and many). The target cardinality is the number of target business objects in the relation (e.g., selected from 1, 2, and many). The containment property defines whether the target business object is contained in the source business object. As an example, a specific data relation between a one business object and another may have source cardinality of one, and a target cardinality of one, indicating that there is only one source document and one target document in the relation.

The domain-specific service elements 22 may refer to the service oriented architecture (SOA) services in the SOA infrastructure 146 employed by the specific domain. The SOA services can be represented by abstract entities that are bound to the specific services in the SOA later in the deployment process.

The DomainMM 10 thus enables business objects to be defined and to relate them to domain concepts (which are also governed objects) such as DSServices 22 and DSActivityTypes 24. The DomainMM 10 may include an overall Domain Library, which allows for any number of individual business domains, or it may be specific to a single business domain.

The DomainMM 10 illustrated in FIG. 3 is a generic version of the domain specification 16 and can be instantiated with different configurations of the elements shown. Instantiation includes providing definitions of the governed objects specific to the domain of interest. For example, definitions of business objects of type Document could include a Contract definition, an Invoice definition, and so forth. As will be appreciated, in some instantiations of the DomainMM 10, some elements may be omitted/empty.

The domain-specific process model 12 includes elements of the general class Process 173, which includes subclasses Step 174 and Transition 176. Steps may be linked to Services 178, which are linked to DSServices 22 in the DomainMM 10 by links 152, each link being associated with a DSService id for the respective DSService to be employed. Similarly the steps 174 may be linked to DSActivityTypes 24, by links 150.

The instance 16 of the DomainMM 10 and the instance 36 of the ProcessMM 12 are used to generate a BPMN process model 42, which is an instance of the BPMN MM 14.

In executing a BPMN business process, the real world resources that the business objects represent, such as digital documents in formats such as Word, PDF, JPEG, web pages, etc., may be retrieved with a Uniform Resource Locator (e.g., an http address).

As described in Mos 2016, a DomainMM is useful for several proposes: 1) to store the domain information in a central repository on the collaboration and distribution server; 2) to generate a domain editor (textual) that can be used stand-alone or embedded in a graphical editor as part of a diagram designer; 3) to make the connection with the behavioral view (processMM) specifying how process steps are going to be represented and connected to the domain; and 4) to inform and update Service-Level Agreements (SLAs) for business concepts. This ensures that all activities and all processes that refer to a particular business object can be easily defined and accessed. This can bring useful when changes to company policies have sweeping implications on many business objects, as they can be automatically propagated to all the relevant activities and processes. The present DomainMM 10 also supports the instantiation of a data model 28, which includes all of the business objects instantiated in the domain specification. This introduces the capability to define and externalize business-objects.

Figure 4:
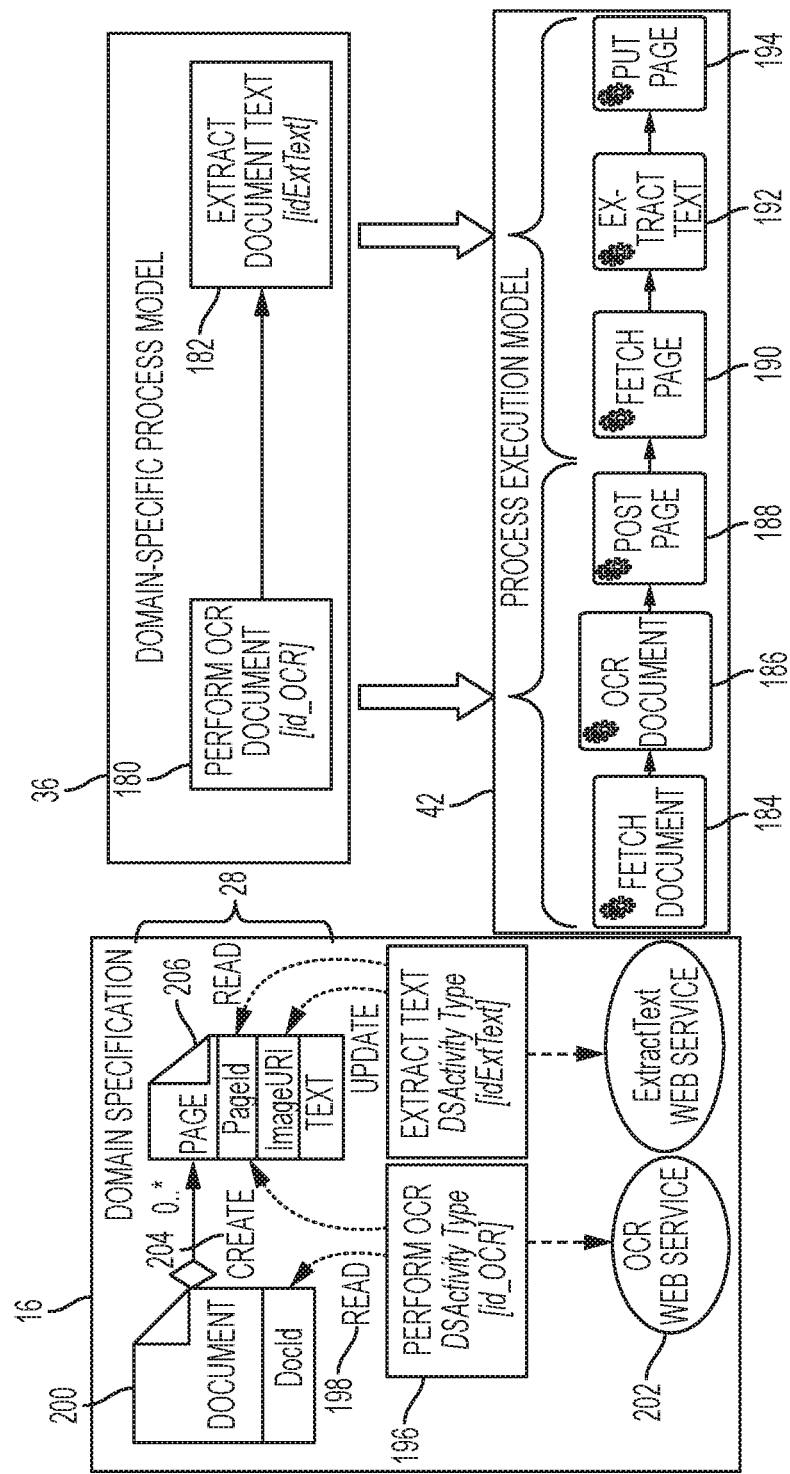
FIG. 4 schematically illustrates an example of domain definition and process definition in accordance with one aspect of the exemplary embodiment.

FIG. 4 shows an example of the generation of a simple process execution model 42 in a domain-independent language, such as BPMN. A domain-specific process model 36 includes a sequence of process steps 180, 182, etc., which are instantiations of the generic Step 174 in the ProcessMM 12. Each step has a textual description, which aids the user in defining the process, such as "Perform OCR document," and has an associated identifier, e.g., idOCR, which is used by the BPMN generator to generate corresponding activities 184, 186, 188, and 190, 192, 194 in the BPMN process execution model 42.

A DSActivityType 22 in the Domain Specification 16 generally produces several BPMN activities in order to support all the information defined in the domain. For example, as FIG. 4 shows, one DSActivityType: "Perform OCR" 196 results in the generation of three BPMN activities 184, 186, 188. The first activity 184 corresponds to a READ ActivityRelation 198 between the referred DSActivityType 196 and the Document business object 200 (an instantiation of business object 20). The second activity 186 corresponds to the actual OCR service call 202 (an instance of the class DSService 22), also defined in the domain. The third BPMN activity 188 corresponds to a CREATE ActivityRelation 204 with a Page business object 206. The generated processes are automatically connected to the REST-API 32 that deals with the process data-model 28 (FIG. 1). Therefore, the data-integration effort is minimized. Then, process users 44 of the process 42 can interact with the process engine 46 in order to execute the required activities.

Figure 5:
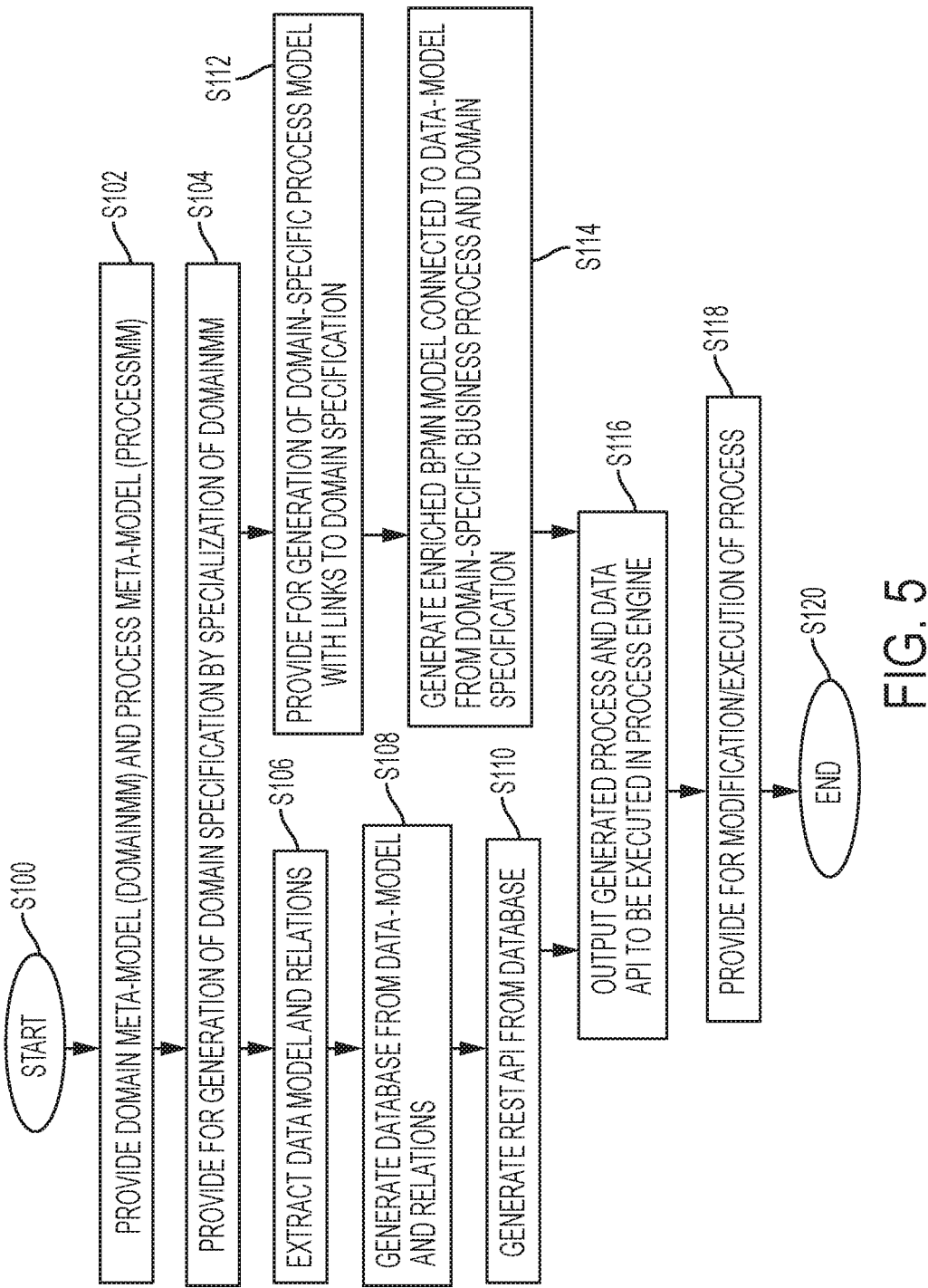
FIG. 5 is a flow chart illustrating a method for data externalization and access in accordance with another aspect of the exemplary embodiment.

With reference now to FIG. 5 a computer implemented method which can be performed with the system of FIGS. 1 and 2 is illustrated. The method starts at S100.

At S102, a domain meta-model 10 and a process meta-model 12 are provided (generated or already in existence). The domainMM 10 supports the capability be instantiated as a data-model 28 for a process collection. The domain MM 10 may include definitions, such as: each business object 20 has a set of features, such as an id, label, description, version, and icon, each attribute 158 is linked to a business object, and each business object 20 is linked to a domain-specific activity type 24 by a business object relation 160. Definitions of relations 160, 170, and other elements 22, 24, etc., of the domain meta-model 10 are also included.

At S104, a domain specification 16 is provided, e.g., generated by instantiation of the DomainMM 10. For example, a domain expert 18 specializes DomainMM 10 of FIG. 3 in order to define a domain specification 16 for a specific domain.

At S106, a data model 28, which includes the business objects 20, and their relations 160, 170, is automatically extracted from the domain specification 16.

At S108, a database 32 is automatically generated from the extracted data model 28 and the relations. The database 32 is in a form that can be queried with suitable queries, such as SQL queries, such as "Fetch all invoices with label "Invoices January 2018". Each domain specification 16 can have its own database 32.

At S110, a REST-API 34 or other suitable API is generated. The REST-API permits interactions with the database 34 in an easy and platform-independent way.

At S112, provision is made for a user 38 to generate a domain-specific process model 36. This may include generating a process studio, which permits an analyst 38 to build the domain-specific processes 36 using graphical representations of elements of the process, as described in Mos, et al., "Generating domain-specific process studios," 20th Int'l Enterprise Distributed Object Computing Conference (EDOC), pp. 1-10, IEEE (2016), and Cortes-Cornax 2017.

At S114, the domain-specific process model 36 is transformed to a domain-independent one. Specifically, a domain-independent process model 42 is generated, by the BPMN generator 40. The BPMN code for the process model is enriched with a set of generation patterns 210, 212, 214, 216 (described below with reference to FIGS. 6-9). These patterns take into account the BORelations 160 between the domain-specific activity types 24 and the business objects 20 in order to create the BPMN activities 184, 186, etc. to deal with the process data 28 through the REST-API 34.

At S116, the generated (and executable) BPMN process model 42 with preconfigured data connections to the API 34 is output, to the process engine 46.

At S118, provision is made for a user 44 to modify and/or execute a process with the execution model 42. This includes generating one or more calls to the REST API 34 to perform functions with respect to business objects in the database 32.

The method ends at S120.

The method illustrated in FIG. 5 may be implemented in a computer program product(s) that may be executed on a computer(s). The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 5, can be used to implement the method. As will be appreciated, while the steps of the method may all be computer implemented, in some embodiments one or more of the steps may be at least partially performed manually.

With reference to FIGS. 6-9, generation patterns 210, 212, 214, and 216 are illustrated graphically. Each pattern corresponds to one of the defined BORelations 160 between domain-specific activity types and the business objects. Other generation patterns may also be defined, which are not related to data-externalization. In addition to the creation of activities in the process execution model 42, the BPMN generator 40 also deals with the mapping of the data coming from generated service calls and the process data (represented as process variables).

Figure 6:
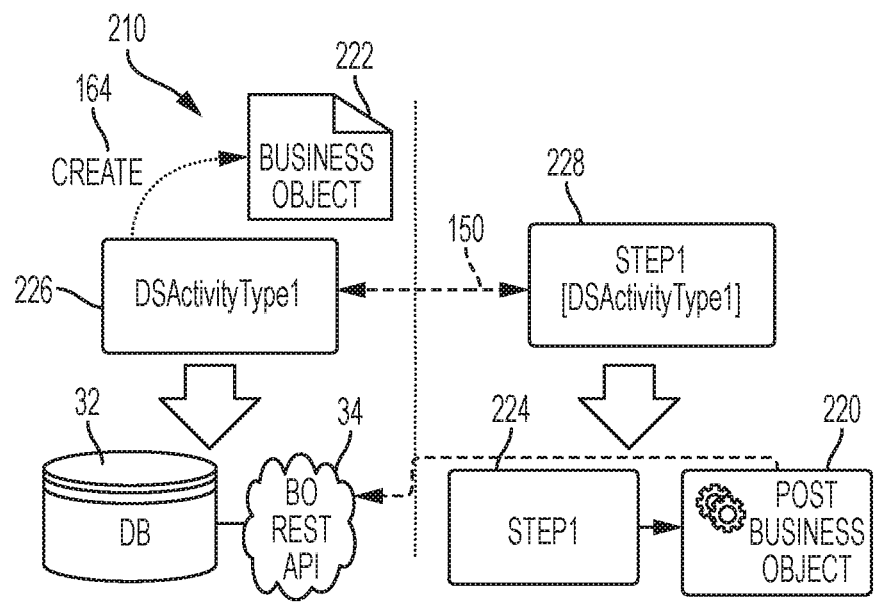
FIGS. 6-9 schematically illustrate aspects of the data externalization method of FIG. 5.

As shown in FIG. 6, the CREATE BORelation 164 generates a POST service call 220 to the REST-API 34, resulting in the creation of a new business object 222 in the database. This task is performed after the actual activity indicated in Step 1 224. In the domain specification, the CREATE BOrelation links a business object to one of the activity types 24, here, referred to as DSActivityType 1 226. The DSActivityType 226 is also linked by a link 150 to a step in the domain-specific process model, here referred to as Step 1 228. Thus, when generating the BPMN process, the BPMN generator 40 instantiates the activity Step 1 224 from the corresponding step 228 and provides for the generation of the POST call 220.

Figure 7:
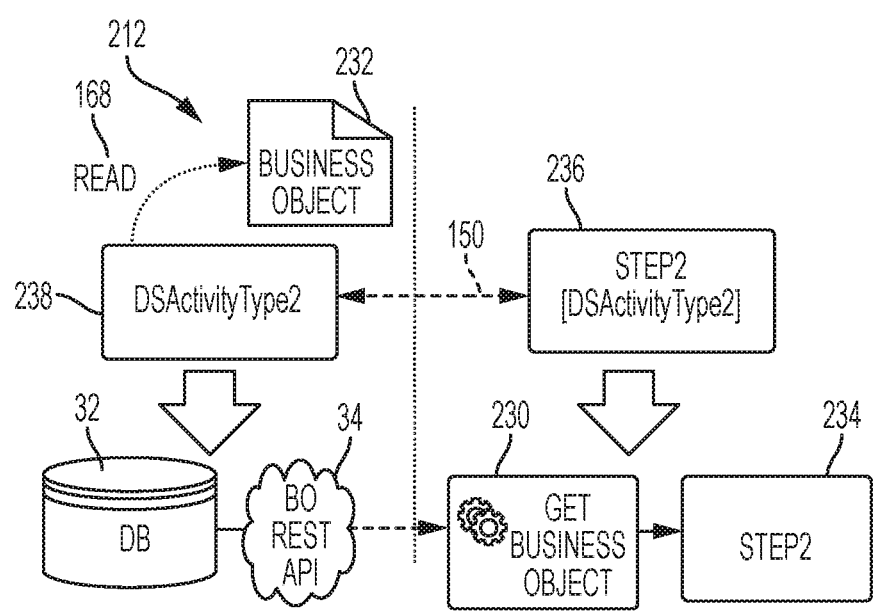

As shown in FIG. 7, the READ BORelation 168 generates a GET service call 230 on the REST-API 34, meaning the fetch of a business object 232, considered as input of the next activity 234 (Step 2). The fetched business object 232 will be mapped to a local process variable. Thus, when generating the BPMN process, the BPMN generator 40 instantiates the activity Step 2 230 from the corresponding step 236 in the domain-specific process and provides for the generation of the GET call 220 prior to implementing the activity Step 2 234. As for FIG. 6, the step 236 is linked to a specific DSActivityType 238 in the domain specification, here referred to as DSActivityType 2.

Figure 8:
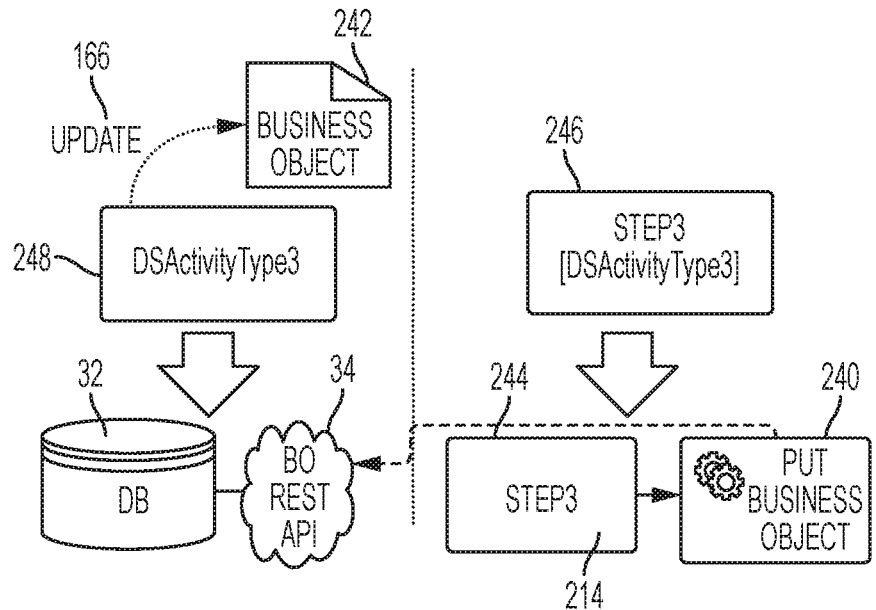

As shown in FIG. 8, the UPDATE relation 166 generates a PUT service call 240 on the REST-API 34, meaning the update of a business object 242 after a processing activity 244 (Step 3). Thus, when generating the BPMN process, the BPMN generator 40 instantiates the activity Step 3 244 from the corresponding step 246 in the domain-specific process and provides for the generation of the PUT call 240 after implementing the activity Step 3 244 to put the updated business object 242 back into the database 32. As for FIG. 6, the step 246 is linked to a specific DSActivityType 248 in the domain specification, here referred to as DSActivityType 3.

Figure 9:
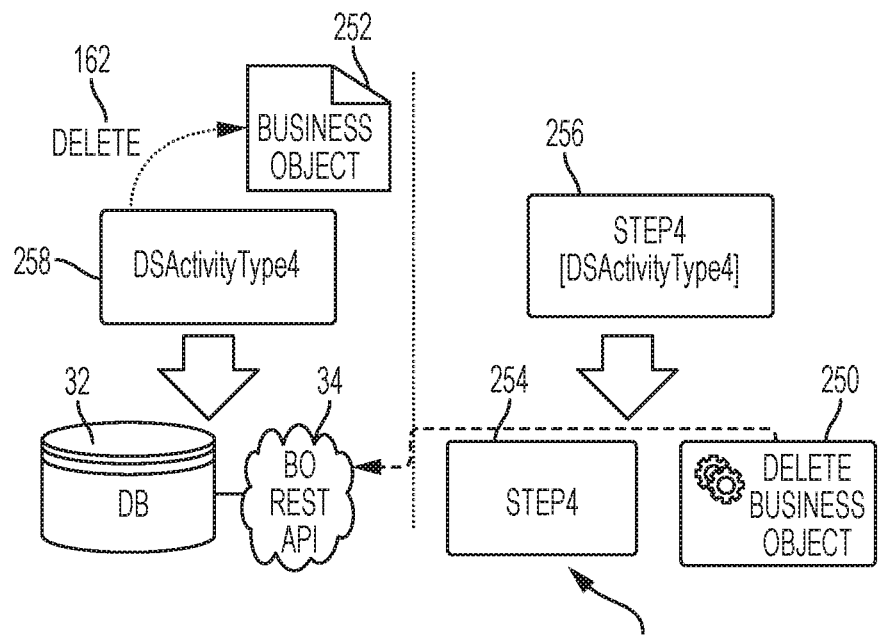

As shown in FIG. 9, the DELETE BORelation 162 generates a DELETE service call 250 on the REST-API 34, meaning the removal of a business object 252 from the database 32. This task is performed after the activity Step 4 254. Thus, when generating the BPMN process, the BPMN generator 40 instantiates the activity Step 4 254 from the corresponding step 256 in the domain-specific process and provides for the generation of the DELETE call 250 after implementing the activity Step 4 254 to remove the business object 252 from the database 32. As for FIG. 6, the step 256 is linked to a specific DSActivityType 258 in the domain specification, here referred to as DSActivityType 4.

The generation patterns illustrated in FIGS. 6-9 may be combined in various ways. For example, an OCR process may include a GET service call for a scanned document. After an OCR activity, a created OCR document is posted to the database with a PUT call. The no longer needed scanned document could then be removed from the database with a DELETE call. If a document has more than one page, the process may loop back to the GET call for the next page, and so forth.

The provision for a multiplicity of data elements may thus generate complex sequences of BPMN tasks including loops, conditions, etc.

Figure 10:
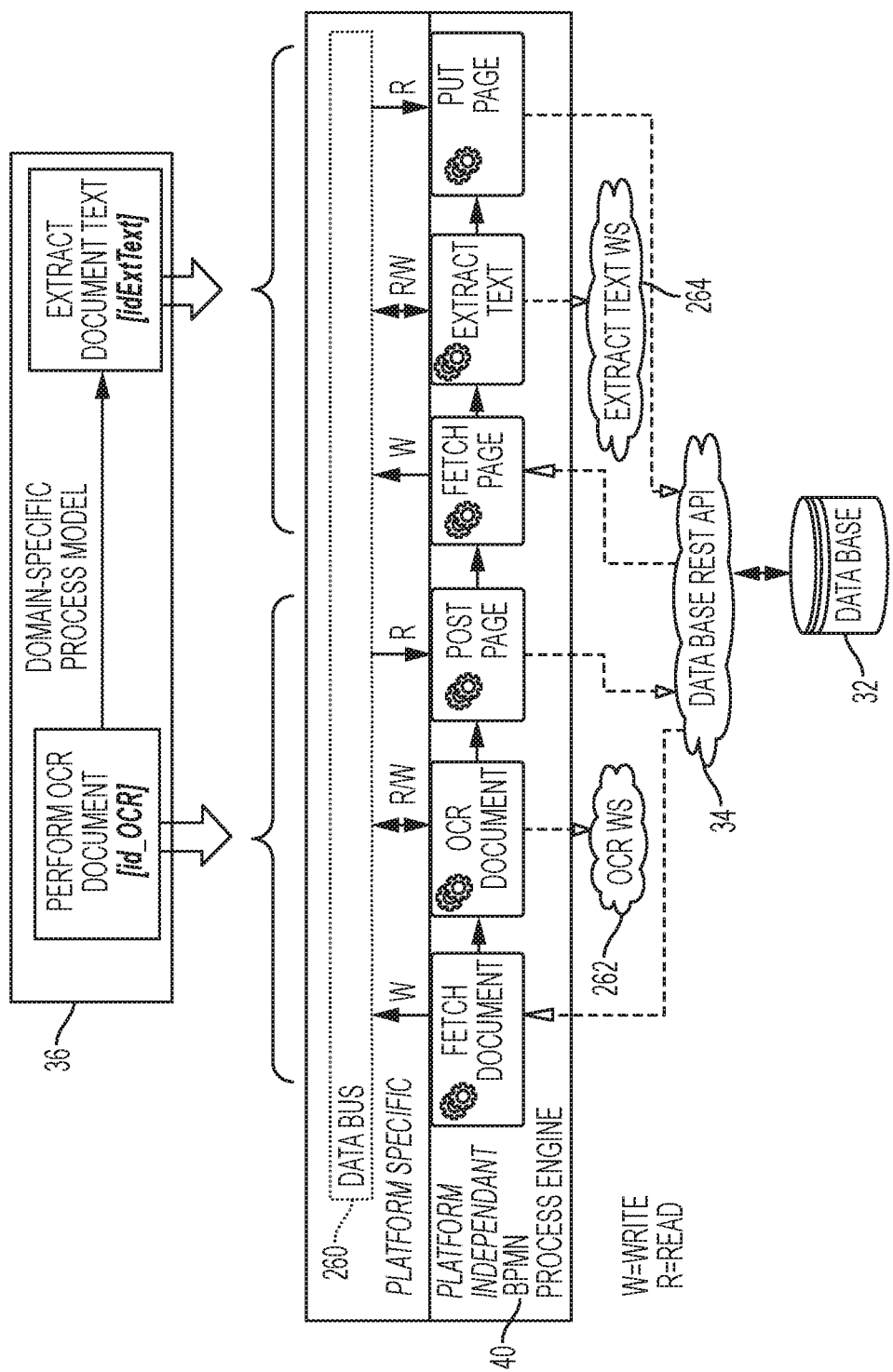
FIG. 10 illustrates interactions between a platform independent process engine and a database.

As illustrated in FIG. 10, a data bus 260 may be generated that supports the link between the process variables (uniquely identified) and the inputs and outputs of external services 262, 264. This implementation is platform specific.

Prototype Implementation

Figure 11:
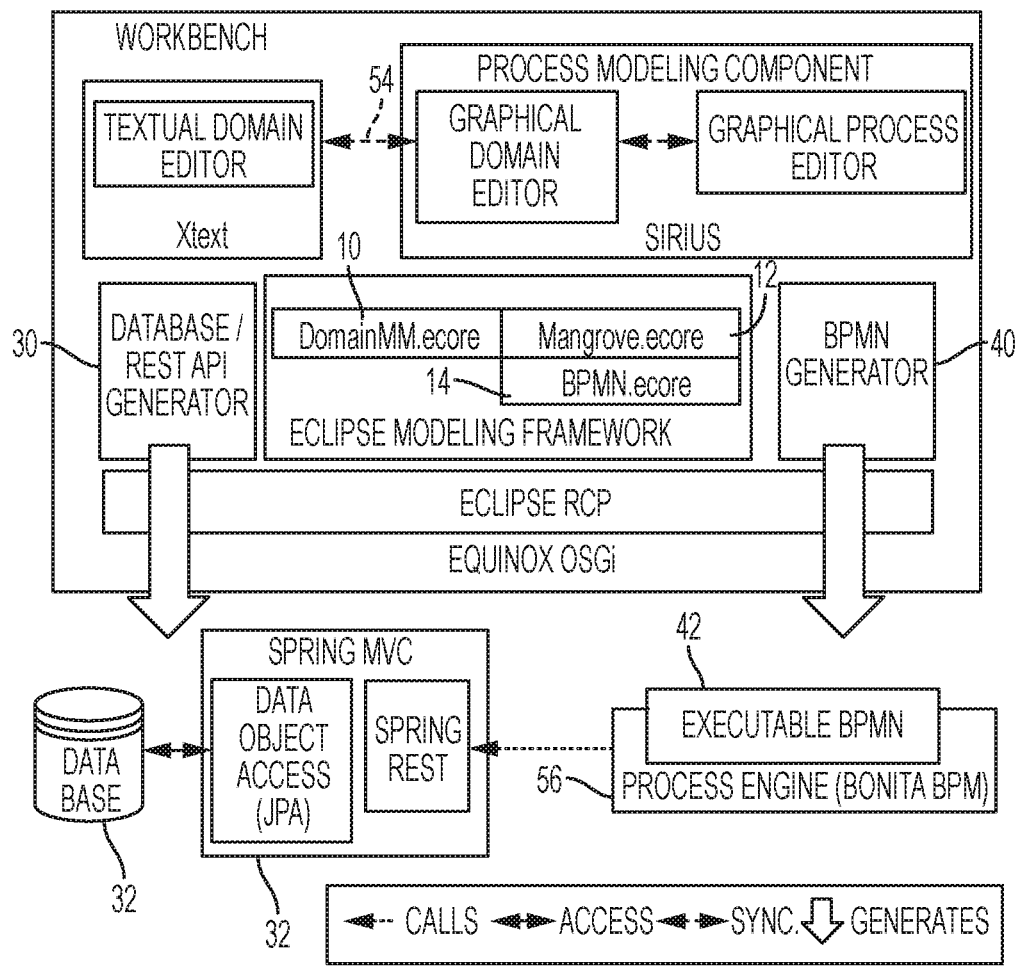
FIG. 11 schematically illustrates a prototype system for evaluation of the method.

With reference to FIG. 11, one example implementation of the system will now be described. This prototype relies on a set of mature and open-source Eclipse technologies. For the data model 28 generation, the Spring Framework is used. The domain-specific process studio relies principally on the Eclipse IDE (https://eclipse.org/ide/), which is used as backbone to support the process design and governance environment. The Eclipse IDE is contained in an Equinox (OSGI implementation) (http://www.eclipse.org/equinox/). This framework provides a bundle-based infrastructure that permits developers to build applications as a set of independent components. The Eclipse Modelling Framework (EMF) (http://www.eclipse.org/modeling/emf/) is used for the definition of the meta-models such as the DomainMM 10, the MangroveMM (i.e., the processMM 12) (https://www.eclipse.org/mangrove/) and the BPMN MM 14, which supports the BPMN process execution model. The Mangrove MM (https://www.eclipse.org/mangrove/) is used as a pivot meta-model that enables the link between the DomainMM 10 and the BPMN 2.0 MM for generation purposes.

On top of EMF, the Eclipse Xtext framework (https://eclipse.org/Xtext/) generates a fully featured textual editor for generating domain descriptions 16 relying on the DomainMM. The EMF ecore meta-models are the inputs for a Sirius domain-specific editor (https://eclipse.org/sirius/). This tool allows an easy creation of the configurable graphical modeling studios (definition of the templates and the interpreted user interface). The BPMN 2.0 generation is managed by a generator coded in Java, that instantiates the BPMN MM relying on the domain-specific process model.

For the data-centric aspects, the Spring framework (https://projects.spring.io/spring-framework/) builds the Data Access Objects (DAO), which access the Database 32 and the REST API 34. The latter will be called by the process engine 56. BonitaBPM (http://www.bonitasoft.com/) was used as an example target engine platform.

In data-model tools such as PMSoft (http://pmsoft.com/), the data structures and variables used in the process are defined. They provide sophisticated graphical data-modeling which can be shared with other processes. However their data structures are platform-dependent.

By defining business-objects in the domain-specific layer, an enterprise can easily share and use their data using the business-object repositories within different process descriptions.

Existing data-model definition approaches are typically technology-specific and generic with respect to the business domain. This limits the ability of business matter experts to express their intent and enact process change. The exemplary system and method provide the business stakeholders with means to externalize the data modeling of a process collection in a platform-independent way, easily accessible from different process engines that automate the workflow. In addition, it enables the governance and maintenance of business-objects from a high-level, with the ability to impact the entire collection of business processes in a domain, if required. Relying on domain specific business-objects, analysts are able to model and control the data of a large collection of process descriptions.

Capturing domain-specific business provides three main advantages:

1. A platform-independent data modeling capability exposed as a REST-API.

2. A centralized management of the enterprise data that can be reused for different processes.

3. A more precise description of the domain, which implies more sophisticated generation patterns to produce executable processes.

The solution is supported by tools that automate the definition of the business-objects in a graphical environment. As in Mos 2016 that relies on the domain-specific layer, the present system provides powerful means to understand and model a critical part of processes in order to enable work-flow automation and overall process governance. The externalization of the data governance also means that the generation code (or manually added code) required to create a fully running process can be reduced. This brings the domain-specific process design closer to execution. This can also facilitate use of different domain-independent languages than BPMN. Since the platform-specific orchestration code (code that runs the process) needs to deal with less aspects, changing the orchestration engine is easier. It is therefore possible to target execution environments relying on languages different to BPMN, such as Python or others, keeping only connectors to the external data management elements described herein.

In contrast to existing methods for providing REST-API access to a data-model, the API is independent of the platform. This is achieved by externalizing the data definition and the REST-API generation. The only platform dependent component that is employed in a platform independent process engine is a data bus 260, which provides the mapping between the process engine variables and the service calls.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for externalizing data comprising:
providing a domain specification which includes domain-specific business objects, domain-specific services, and domain-specific activity types, and links between them;
extracting a reusable data model from the domain specification, the data model including a set of business objects linked by data relations, at least some of the business objects in the data model being linked to a domain-specific activity type by a respective one of a set of defined business object relations;
with a database generator, generating a relational database from the data model, which stores a collection of reusable business objects and their business object relations;
automatically generating a platform-independent application program interface, the relational database being accessible through the application program interface, the application program interface updating and saving data to the relational database and fetching data from the relational database;
providing for a user to generate a domain-specific process model with links to business objects in the domain specification, including, with a graphical user interface generator, generating a graphical representation of the process model using graphical description templates for representing process steps in the graphical representation, for display to the user on a graphical user interface;
with a domain-independent generator, automatically transforming the domain-specific process model to a domain-independent process model which has access to the database through the application program interface;
wherein the extracting, generating, providing and transforming are performed with a processor.

2. The method of claim 1, wherein in the domain specification, each business object is a governed object and has a set of features.

3. The method of claim 1, wherein in the domain specification, at least some of the business objects are each linked to a different business object by a data relation.

4. The method of claim 1, further comprising instantiating the domain specification from a domain meta-model.

5. The method of claim 1, wherein the application program interface is a REST-API.

6. The method of claim 1, wherein the domain-specific process model includes graphical representations of elements of the process.

7. The method of claim 1, wherein the domain-independent process model is in BPMN.

8. The method of claim 1, wherein the transforming includes applying a set of generation patterns which take into account the business object relations between the domain-specific activity types and the business objects in order to create activities, in a domain-independent language, that are able to access business objects through the application program interface.

9. The method of claim 8, wherein each of the generation patterns corresponds to one of the defined business object relations between domain-specific activity types and the business objects.

10. The method of claim 1, wherein the domain specification is an instance of a domain meta-model, the domain-specific process model is an instance of a process meta-model and the domain-independent process model is an instance of a domain-independent meta-model.

11. The method of claim 1, wherein the transforming includes combining the domain specification and the domain-specific process model to generate the domain-independent process model in BPMN, the BPMN process model being an instance of a BPMN meta-model.

12. The method of claim 1, further comprising executing a process including generating one or more calls to the application program interface to perform functions with respect to business objects in the database.

13. The method of claim 12, wherein the functions are selected from the group consisting of:
creating a new business object in the database;
updating an existing business object in the database;
reading an existing business object in the database;
deleting an existing business object in the database; and
combinations thereof.

14. A system comprising memory which stores instructions for performing the method of claim 1 and a processor, in communication with the memory, for executing the instructions.

15. A computer program product comprising non-transitory memory storing instructions which, where executed by a computer, perform the method of claim 1.

16. A system for externalizing data comprising:
a database and application program interface generator which:
generates a relational database from a data model of a domain specification, the data model including a set of business objects linked by data relations, at least some of the business objects in the data model being linked to a domain-specific activity type by a business object relation, the relational database storing a collection of reusable business objects and their business object relations, and
generates a platform-independent application program interface for accessing the data model, the application program interface updating and saving data to the relational database and fetching data from the relational database;
a process specification component which provides for a user to generate a domain-specific process model with links to business objects in the domain specification, including, with a graphical user interface generator, generating a graphical representation of the process model using graphical description templates for representing process steps in the graphical representation, for display to the user on a graphical user interface;

a domain-independent generator for transforming the domain-specific process model to a domain-independent process model which has access to the database through the application program interface; and at least one processor for implementing the database and application program interface generator, process specification component, and generator for transforming the domain-specific process model to the domain-independent process model.

17. The system of claim 16, further comprising a domain specification component for assisting a user in specializing a domain meta-model to generate the domain specification.

18. The system of claim 16, wherein the database is resident on a separate computing device from at least one of the database and application program interface generator, process specification component, and generator for transforming the domain-specific process model to the domain-independent process model.

19. A method for externalizing data comprising:
instantiating a domain specification as an instance of a domain meta-model, the domain specification including a set of business objects;
instantiating a domain-specific process model as an instance of a process meta-model;
extracting a reusable data model from the domain specification, the data model including the set of business objects linked by data relations, at least some of the business objects in the data model being linked to a domain-specific activity type by a respective one of a set of defined business object relations;
generating a platform-independent application program interface;
generating a relational database from the data model which is accessible through the application program interface, the relational database storing a collection of reusable business objects and business object relations;
generating a domain-independent process model from the domain-specific process model and the domain specification, the domain-independent process model being an instance of a domain-independent process meta-model, the domain-independent process model having access to the database through the application program interface, the generating including, with a graphical user interface generator, generating a graphical representation of the process model using graphical description templates for representing process steps in the graphical representation, for display to the user on a graphical user interface; and
executing a process with the domain-independent process model, including generating one or more calls to the application program interface to perform functions with respect to business objects in the database.

20. The method of claim 19, wherein the meta-model provides for:
linking a business object in the domain specification to a different business object in the domain specification with a data relation; and
linking a business object in the domain specification to a domain-specific activity type with a business object relation.

* * * * *